United States Patent
Nakamura et al.

(10) Patent No.: US 9,912,007 B2
(45) Date of Patent: Mar. 6, 2018

(54) SECONDARY BATTERY, BATTERY PACK, ELECTRIC VEHICLE, ELECTRIC POWER STORAGE SYSTEM, ELECTRIC POWER TOOL, AND ELECTRONIC APPARATUS

(71) Applicant: Sony Corporation, Tokyo (JP)

(72) Inventors: Aiko Nakamura, Kanagawa (JP); Tadahiko Kubota, Kanagawa (JP); Kazumasa Takeshi, Kanagawa (JP); Shuhei Sugita, Kanagawa (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 182 days.

(21) Appl. No.: 14/507,082

(22) Filed: Oct. 6, 2014

(65) Prior Publication Data

US 2015/0104692 A1 Apr. 16, 2015

(30) Foreign Application Priority Data

Oct. 11, 2013 (JP) ................................ 2013-213446

(51) Int. Cl.
*H01M 10/0525* (2010.01)
*H01M 10/0568* (2010.01)

(52) U.S. Cl.
CPC ... *H01M 10/0525* (2013.01); *H01M 10/0568* (2013.01); *H01M 2220/10* (2013.01); *H01M 2220/20* (2013.01); *H01M 2220/30* (2013.01); *H01M 2300/0025* (2013.01); *H01M 2300/0091* (2013.01); *Y02E 60/122* (2013.01); *Y02T 10/7011* (2013.01)

(58) Field of Classification Search
CPC ......... H01M 10/0525; H01M 10/0568; H01M 2220/10; H01M 2220/20; H01M 2220/30; H01M 2300/0025; H01M 2300/0091; Y02E 60/122; Y02T 10/7011
See application file for complete search history.

(56) References Cited

U.S. PATENT DOCUMENTS

| | | | |
|---|---|---|---|
| 5,296,318 A | 3/1994 | Gozdz et al. | |
| 5,783,322 A * | 7/1998 | Nagai | H01M 10/48 320/134 |
| 6,387,570 B1 * | 5/2002 | Nakamura | H01B 1/122 429/300 |

(Continued)

FOREIGN PATENT DOCUMENTS

| | | | |
|---|---|---|---|
| EP | 0969580 A2 * | 1/2000 | .......... B60L 11/1864 |
| JP | 09259890 | 10/1997 | |

(Continued)

OTHER PUBLICATIONS

J-PlatPat Machine Translation of the detailed description of JP 2011-048990A (Mar. 2011).*
Japanese Office Action dated Jan. 9, 2018 in corresponding Japanese Application No. 2013-213446.

*Primary Examiner* — Gregg Cantelmo
(74) *Attorney, Agent, or Firm* — K&L Gates LLP

(57) ABSTRACT

A secondary battery includes: a cathode; an anode; and an electrolyte layer containing a nonaqueous electrolytic solution and a polymer compound, wherein the polymer compound contains a block copolymer, and the block copolymer contains vinylidene fluoride, hexafluoro propylene, and one or more of monomethyl maleate, trifluoroethylene, and chlorotrifluoroethylene as polymerization units.

12 Claims, 5 Drawing Sheets

(56) References Cited

U.S. PATENT DOCUMENTS

| | | | | |
|---|---|---|---|---|
| 6,506,523 | B1 * | 1/2003 | Hatazawa | H01M 10/0565 429/316 |
| 6,777,136 | B2 * | 8/2004 | Morigaki | H01M 2/1653 29/623.1 |
| 2003/0157410 | A1 * | 8/2003 | Jarvis | H01B 1/122 429/316 |
| 2008/0254368 | A1 * | 10/2008 | Ooyama | H01M 4/133 429/223 |
| 2010/0319944 | A1 * | 12/2010 | Schmehl | B25F 5/001 173/47 |
| 2011/0166733 | A1 * | 7/2011 | Yu | B60K 6/445 701/22 |
| 2011/0311885 | A1 * | 12/2011 | Yamada | C07F 1/005 429/338 |
| 2012/0328945 | A1 * | 12/2012 | Hirose | H01M 2/1673 429/219 |

FOREIGN PATENT DOCUMENTS

| | | | |
|---|---|---|---|
| JP | 11312536 | | 11/1999 |
| JP | 2000-123873 | | 4/2000 |
| JP | 2002-522872 | | 7/2002 |
| JP | 2004-505432 | | 2/2004 |
| JP | 2006-286496 | | 10/2006 |
| JP | 2008-098054 | | 4/2008 |
| JP | 2008-098055 | | 4/2008 |
| JP | 2011048990 | A * | 3/2011 |

\* cited by examiner

SECONDARY BATTERY, BATTERY PACK, ELECTRIC VEHICLE, ELECTRIC POWER STORAGE SYSTEM, ELECTRIC POWER TOOL, AND ELECTRONIC APPARATUS

CROSS REFERENCES TO RELATED APPLICATIONS

The present application claims priority to Japanese Priority Patent Application JP 2013-213446 filed in the Japan Patent Office on Oct. 11, 2013, the entire content of which is hereby incorporated by reference.

BACKGROUND

The present application relates to a secondary battery including an electrolyte layer containing an electrolytic solution and a polymer compound, and to a battery pack, an electric vehicle, an electric power storage system, an electric power tool, and an electronic apparatus that use the secondary battery.

In recent years, various electronic apparatuses such as a mobile phone and a personal digital assistant (PDA) have been widely used, and it has been demanded to further reduce the size and the weight of the electronic apparatuses and to achieve their long lives. Accordingly, as an electric power source for the electronic apparatuses, a battery, in particular, a small and light-weight secondary battery capable of providing high energy density has been developed.

In these days, it has been considered to apply such a secondary battery not only to the electronic apparatuses but also to other applications. Examples of such other applications may include a battery pack attachably and detachably mounted on the electronic apparatuses or the like, an electric vehicle such as an electric automobile, an electric power storage system such as a home electric power server, and an electric power tool such as an electric drill.

The secondary battery includes an electrolytic solution together with a cathode and an anode. The electrolytic solution is included in a secondary battery generally in a state that a separator is impregnated with the electrolytic solution. In addition thereto, in some cases, the electrolytic solution may be included in a secondary battery in a state of being supported by a polymer compound. In this case, the secondary battery includes an electrolyte layer as a so-called gel electrolyte. In such a secondary battery including the electrolyte layer, leakage of the electrolytic solution is prevented.

The configuration of the polymer compound contained in the electrolyte layer may largely affect battery characteristics of the secondary battery. Therefore, various studies have been made on the configuration of the polymer compound.

Specifically, in order to improve mobility of lithium ions, a random copolymer containing vinylidene fluoride and hexafluoro propylene as polymerization units or the like is used (for example, see U.S. Pat. No. 5,296,318). In order to improve energy density without damaging discharge load characteristics, a block copolymer containing vinylidene fluoride and hexafluoro propylene as polymerization units or the like is used (for example, see Japanese Unexamined Patent Application Publication No. 2000-123873). In order to prevent acute heat generation at the time of occurrence of internal short circuit or the like, as a denaturing agent, monomethyl maleate or the like is added to a random copolymer containing vinylidene fluoride and hexafluoro propylene as polymerization units or the like (for example, see Japanese Unexamined Patent Application Publication No. 2006-286496).

SUMMARY

Various studies have been made on influence of a polymer compound in an electrolyte layer upon battery characteristics of a secondary battery. However, since sufficient battery characteristics have not been obtained yet, there is room for improvement.

It is desirable to provide a secondary battery, a battery pack, an electric vehicle, an electric power storage system, an electric power tool, and an electronic apparatus that are capable of obtaining superior battery characteristics.

According to an embodiment of the present application, there is provided a secondary battery including a cathode, an anode, and an electrolyte layer containing a nonaqueous electrolytic solution and a polymer compound, wherein the polymer compound contains a block copolymer, and the block copolymer contains vinylidene fluoride, hexafluoro propylene, and one or more of monomethyl maleate, trifluoroethylene, and chlorotrifluoroethylene as polymerization units.

According to an embodiment of the present application, there is provided a battery pack including: a secondary battery; a control section configured to control operation of the secondary battery; and a switch section configured to switch the operation of the secondary battery according to an instruction of the control section, wherein the secondary battery includes a cathode; an anode; and an electrolyte layer containing a nonaqueous electrolytic solution and a polymer compound, the polymer compound contains a block copolymer, and the block copolymer contains vinylidene fluoride, hexafluoro propylene, and one or more of monomethyl maleate, trifluoroethylene, and chlorotrifluoroethylene as polymerization units.

According to an embodiment of the present application, there is provided an electric vehicle including: a secondary battery; a conversion section configured to convert electric power supplied from the secondary battery into drive power; a drive section configured to operate according to the drive power; and a control section configured to control operation of the secondary battery, wherein the secondary battery includes a cathode; an anode; and an electrolyte layer containing a nonaqueous electrolytic solution and a polymer compound, the polymer compound contains a block copolymer, and the block copolymer contains vinylidene fluoride, hexafluoro propylene, and one or more of monomethyl maleate, trifluoroethylene, and chlorotrifluoroethylene as polymerization units.

According to an embodiment of the present application, there is provided an electric power storage system including: a secondary battery; one or more electric devices configured to be supplied with electric power from the secondary battery; and a control section configured to control the supplying of the electric power from the secondary battery to the one or more electric devices, wherein the secondary battery includes a cathode; an anode; and an electrolyte layer containing a nonaqueous electrolytic solution and a polymer compound, the polymer compound contains a block copolymer, and the block copolymer contains vinylidene fluoride, hexafluoro propylene, and one or more of monomethyl maleate, trifluoroethylene, and chlorotrifluoroethylene as polymerization units.

According to an embodiment of the present application, there is provided a electric power tool including secondary battery; and movable section configured to be supplied with electric power from the secondary battery, wherein the secondary battery includes a cathode; an anode; and an electrolyte layer containing a nonaqueous electrolytic solution and a polymer compound, the polymer compound contains a block copolymer, and the block copolymer contains vinylidene fluoride, hexafluoro propylene, and one or more of monomethyl maleate, trifluoroethylene, and chlorotrifluoroethylene as polymerization units.

According to an embodiment of the present application, there is provided an electronic apparatus including a secondary battery as an electric power supply source, wherein the secondary battery includes a cathode; an anode; and an electrolyte layer containing a nonaqueous electrolytic solution and a polymer compound, the polymer compound contains a block copolymer, and the block copolymer contains vinylidene fluoride, hexafluoro propylene, and one or more of monomethyl maleate, trifluoroethylene, and chlorotrifluoroethylene as polymerization units.

According to the secondary battery of the embodiment of the present application, the polymer compound in the electrolyte layer contains the block copolymer. The block copolymer contains vinylidene fluoride, hexafluoro propylene, and one or more of monomethyl maleate, trifluoroethylene, and chlorotrifluoroethylene as polymerization units. Therefore, superior battery characteristics are obtainable. Further, according to the battery pack, the electric vehicle, the electric power storage system, the electric power tool, and the electronic apparatus of the embodiments of the present application, similar effects are obtainable.

Advantageous effects of the present application are not limited to the above-described effects, and may include any effect described in the present application.

It is to be understood that both the foregoing general description and the following detailed description are exemplary, and are intended to provide further explanation of the technology as claimed.

Additional features and advantages are described herein, and will be apparent from the following Detailed Description and the figures.

BRIEF DESCRIPTION OF THE FIGURES

The accompanying drawings are included to provide a further understanding of the disclosure, and are incorporated in and constitute a part of this specification. The drawings illustrate embodiments and, together with the specification, serve to explain the principles of the technology.

DETAILED DESCRIPTION

An embodiment of the present application will be described below in detail with reference to the drawings. The description will be given in the following order.
1. Secondary Battery
1-1. Configuration of Secondary Battery
1-1-1. Cathode
1-1-2. Anode
1-1-3. Separator
1-1-4. Electrolyte Layer
1-2. Operation of Secondary Battery
1-3. Manufacturing Method of Secondary Battery
1-4. Function and Effect of Secondary Battery
2. Applications of Secondary Battery
2-1. Battery Pack
2-2. Electric Vehicle
2-3. Electric Power Storage System
2-4. Electric Power Tool

[1. Secondary Battery]

First, description will be given of a secondary battery according to an embodiment of the present application (hereinafter simply referred to as the "secondary battery").

[1-1. Configuration of Secondary Battery]

Figure 1:
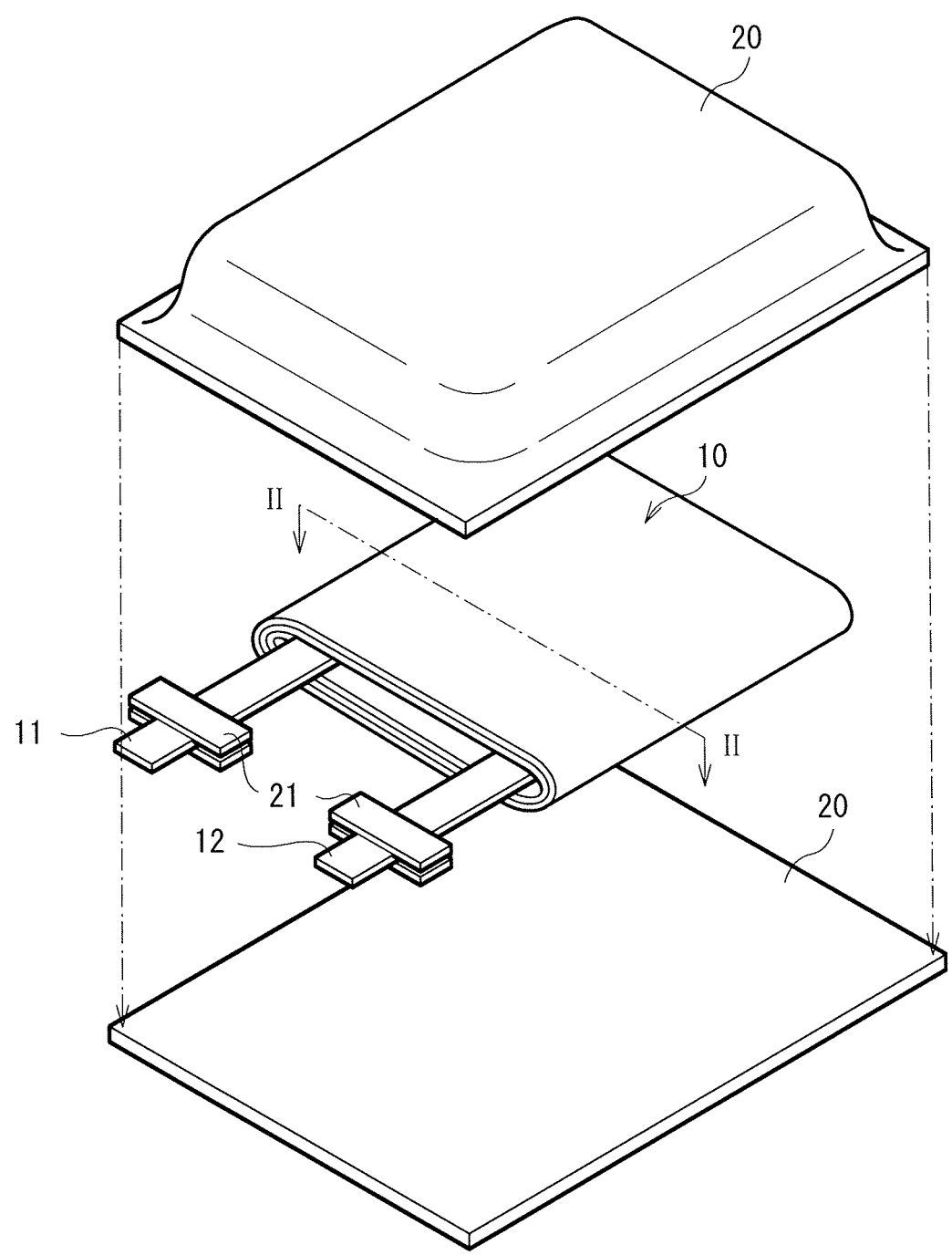
FIG. 1 is a perspective view illustrating a configuration of a secondary battery (a laminated-film-type secondary battery) according to an embodiment of the present application.
Figure 2:
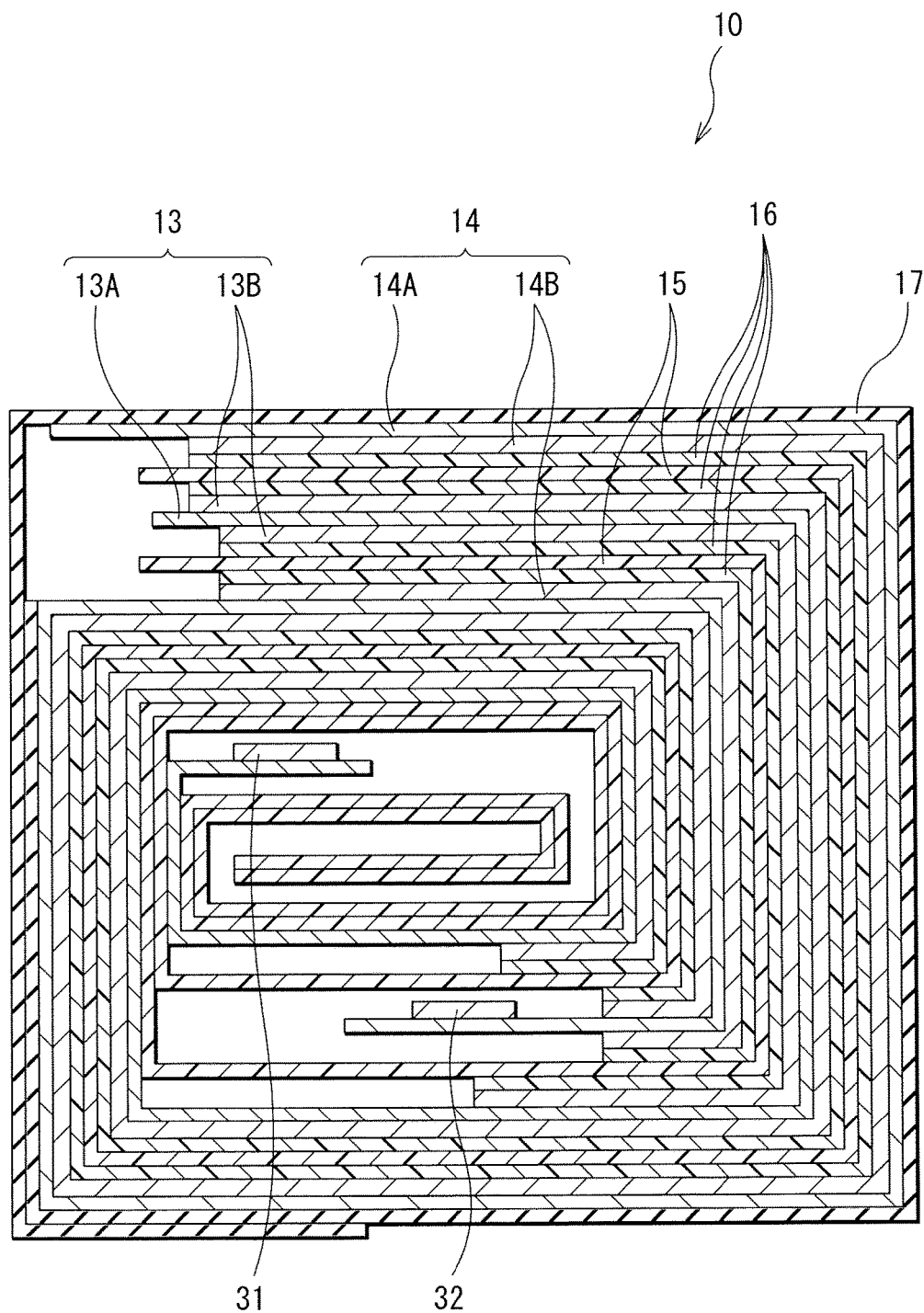
FIG. 2 is a cross-sectional view of a spirally wound electrode body taken along a line II-II illustrated in FIG. 1.

FIG. 1 illustrates a perspective configuration of a secondary battery. FIG. 2 illustrates a cross-sectional configuration of a spirally wound electrode body 10 taken along a line II-II illustrated in FIG. 1.

The secondary battery described here is a secondary battery in which the capacity of an anode 14 is obtained by insertion and extraction of an electrode reactant, and has a so-called laminated-film-type battery structure.

The "electrode reactant" refers to a substance engaging with an electrode reaction. For example, the electrode reactant may be lithium in a secondary battery (a lithium ion secondary battery) capable of obtaining a battery capacity by insertion and extraction of lithium (Li). Description will be given below taking a case in which the secondary battery according to the embodiment of the present application is a lithium ion secondary battery as an example.

For example, in the secondary battery, the spirally wound electrode body 10 is contained in a film-like outer package member 20. The spirally wound electrode body 10 may be formed, for example, by laminating a cathode 13 and an anode 14 with a separator 15 and an electrolyte layer 16 in between, and subsequently spirally winding the resultant laminated body. A cathode lead 11 is attached to the cathode 13, and an anode lead 12 is attached to the anode 14. The outermost periphery of the spirally wound electrode body 10 is protected by a protective tape 17.

The cathode lead 11 and the anode lead 12 may be, for example, led out from inside to outside of the outer package member 20 in the same direction. The cathode lead 11 may be made, for example, of any one or more of electrically-conductive materials such as aluminum (Al). The anode lead 12 may be made, for example, of any one or more of electrically-conducive materials such as copper (Cu), nickel (Ni), and stainless steel. These electrically-conductive materials may be in the shape, for example, of a thin plate or mesh.

The outer package member 20 may be a laminated film in which, for example, a fusion bonding layer, a metal layer, and a surface protective layer are laminated in this order. The outer package member 20 may be formed, for example, by layering two laminated films so that the fusion bonding layers and the spirally wound electrode body 10 are opposed to each other, and subsequently fusion-bonding the respective outer edges of the fusion bonding layers to each other. Alternatively, the two laminated films may be attached to each other by an adhesive or the like. Examples of the fusion bonding layer may include any one or more of films made of polyethylene, polypropylene, and the like. Examples of the metal layer may include an aluminum foil. Examples of the surface protective layer may include any one or more of films made of nylon, polyethylene terephthalate, and the like.

In particular, as the outer package member 20, an aluminum laminated film in which a polyethylene film, an aluminum foil, and a nylon film are laminated in this order may be preferable. However, the outer package member 20 may be made of a laminated film having other laminated structure, a polymer film such as a polypropylene film, or a metal film.

For example, an adhesive film 21 to protect from outside air intrusion may be inserted between the outer package member 20 and the cathode lead 11 and between the outer package member 20 and the anode lead 12. The adhesive film 21 is made of a material having adhesibility with respect to the cathode lead 11 and the anode lead 12. Examples of the adhesive material may include a polyolefin resin. More specific examples thereof may include any one or more of polyethylene, polypropylene, modified polyethylene, modified polypropylene, and the like.

[1-1-1. Cathode]

The cathode 13 may have, for example, a cathode active material layer 13B on both surfaces of a cathode current collector 13A. However, the cathode 13 may have the cathode active material layer 13B only on a single surface of the cathode current collector 13A.

The cathode current collector 13A may be made, for example, of any one or more of electrically-conductive materials such as aluminum (Al), nickel (Ni), and stainless steel.

The cathode active material layer 13B contains, as cathode active materials, any one or more of cathode materials capable of inserting and extracting lithium. However, the cathode active material layer 13B may further contain any one or more of other materials such as a cathode binder and a cathode electric conductor.

The cathode material may be preferably a lithium-containing compound, since thereby, high energy density is obtained. Examples of the lithium-containing compound may include a lithium-transition-metal composite oxide and a lithium-transition-metal-phosphate compound. The lithium-transition-metal composite oxide is an oxide containing lithium and one or more transition metal elements as constituent elements. The lithium-transition-metal-phosphate compound is a phosphate compound containing lithium and one or more transition metal elements as constituent elements. It may be preferable that the transition metal element be any one or more of cobalt (Co), nickel (Ni), manganese (Mn), iron (Fe), and the like, since a higher voltage is obtained thereby. The chemical formula of the lithium-transition-metal composite oxide may be expressed by, for example, $Li_xM1O_2$. The chemical formula of the lithium-transition-metal-phosphate compound may be expressed, for example, by $Li_yM2PO_4$. In the formulas, each of M1 and M2 represents one or more transition metal elements. Values of x and y vary according to the charge and discharge state, and generally satisfy $0.05 \leq x \leq 1.10$ and $0.05 \leq y \leq 1.10$.

Specific examples of the lithium-transition-metal composite oxide may include $LiCoO_2$, $LiNiO_2$, and a lithium-nickel-based composite oxide represented by the following Formula (1). Specific examples of the lithium-transition-metal-phosphate compound may include $LiFePO_4$ and $LiFe_{1-u}Mn_uPO_4$ (u<1). One reason for this is that, in this case, a high battery capacity is obtained and superior cycle characteristics are obtained as well.

$$LiNi_{1-z}M_zO_2 \qquad (1)$$

In Formula (1), M is one or more of cobalt (Co), manganese (Mn), iron (Fe), aluminum (Al), vanadium (V), tin (Sn), magnesium (Mg), titanium (Ti), strontium (Sr), calcium (Ca), zirconium (Zr), molybdenum (Mo), technetium (Tc), ruthenium (Ru), tantalum (Ta), tungsten (W), rhenium (Re), ytterbium (Yb), copper (Cu), zinc (Zn), barium (Ba), boron (B), chromium (Cr), silicon (Si), gallium (Ga), phosphorus (P), antimony (Sb), and niobium (Nb); and z satisfies $0.005<z<0.5$.

In addition thereto, the cathode material may be, for example, any one or more of an oxide, a disulfide, a chalcogenide, an electrically-conductive polymer, and the like. Examples of the oxide may include titanium oxide, vanadium oxide, and manganese dioxide. Examples of the disulfide may include titanium disulfide and molybdenum sulfide. Examples of the chalcogenide may include niobium selenide. Examples of the electrically-conductive polymer may include sulfur, polyaniline, and polythiophene. However, the cathode material may be a material other than the foregoing materials.

Examples of the cathode binder may include any one or more of synthetic rubbers, polymer materials, and the like. Examples of the synthetic rubber may include a styrene-butadiene-based rubber, a fluorine-based rubber, and ethylene propylene diene. Examples of the polymer compound may include polyvinylidene fluoride, polyacrylic acid, and polyimide.

Examples of the cathode electric conductor may include any one or more of carbon materials and the like. Examples of the carbon materials may include graphite, carbon black, acetylene black, and Ketjen black. It is to be noted that the cathode electric conductor may be a metal material, an electrically-conductive polymer, or the like as long as the material has electric conductivity.

[1-1-2. Anode]

The anode 14 may have, for example, an anode active material layer 14B on both surfaces of an anode current collector 14A. However, the anode 14 may have the anode active material layer 14B only on a single surface of the anode current collector 14A.

The anode current collector 14A may be made, for example, of any one or more of electrically-conductive materials such as copper (Cu), nickel (Ni), and stainless steel. The surface of the anode current collector 14A may be preferably roughened. Thereby, due to a so-called anchor effect, adhesibility of the anode active material layer 14B with respect to the anode current collector 14A is improved. In this case, it is enough that the surface of the anode current collector 14A in a region opposed to the anode active material layer 14B is roughened at minimum. Examples of roughening methods may include a method of forming fine particles by utilizing electrolytic treatment. The electrolytic treatment is a method of providing concavity and convexity on the surface of the anode current collector 14A by forming fine particles on the surface of the anode current collector 14A with the use of an electrolytic method in an electrolytic bath. A copper foil fabricated by an electrolytic method is generally called an "electrolytic copper foil."

The anode active material layer 14B contains any one or more of anode materials capable of inserting and extracting lithium as anode active materials. However, the anode active material layer 14B may further contain any one or more of other materials such as an anode binder and an anode electric conductor. Details of the anode binder and the anode electric conductor may be, for example, similar to those of the cathode binder and the cathode electric conductor.

The chargeable capacity of the anode material may be preferably larger than the discharged capacity of the cathode 13 in order to prevent lithium metal from being unintentionally precipitated on the anode 14 in the middle of charge. That is, the electrochemical equivalent of the anode material capable of inserting and extracting lithium may be preferably larger than the electrochemical equivalent of the cathode 13.

Examples of the anode materials may include, for example, any one or more of carbon materials. In the carbon materials, crystal structure change at the time of insertion and extraction of lithium is extremely small. Therefore, the carbon materials provide high energy density and superior cycle characteristics. Further, the carbon materials serve as anode electric conductors as well. Examples of the carbon materials may include graphitizable carbon, non-graphitizable carbon, and graphite. The spacing of (002) plane of the non-graphitizable carbon may be preferably equal to or greater than 0.37 nm, and the spacing of (002) plane of the graphite may be preferably equal to or smaller than 0.34 nm. More specifically, examples of the carbon materials may include pyrolytic carbons, cokes, glassy carbon fiber, an organic polymer compound fired body, activated carbon, and carbon blacks. Examples of the cokes may include pitch coke, needle coke, and petroleum coke. The organic polymer compound fired body is obtained by firing (carbonizing) a polymer compound such as a phenol resin and a furan resin at appropriate temperature. In addition thereto, examples of the carbon materials may include low crystalline carbon and amorphous carbon that are heat-treated at temperature equal to or less than about 1000 deg C. It is to be noted that the shape of any of the carbon materials may be any of a fibrous shape, a spherical shape, a granular shape, and a scale-like shape.

Further, examples of the anode materials may include a material (a metal-based material) containing any one or more of metal elements and metalloid elements as constituent elements, since high energy density is thereby obtained. Such a metal-based material may be any of a simple substance, an alloy, and a compound, may be two or more thereof, or may be a material having one or more phases thereof in part or all thereof. It is to be noted that the "alloy" includes an alloy containing one or more metal elements and one or more metalloid elements, in addition to an alloy configured of two or more metal elements. Further, the "alloy" may contain a non-metallic element. Examples of the structure of the alloy may include a solid solution, a eutectic crystal (eutectic mixture), an intermetallic compound, and a structure in which two or more thereof coexist.

Examples of the foregoing metal elements and the foregoing metalloid elements may include any one or more of metal elements and metalloid elements that are capable of forming an alloy with lithium. Specific examples thereof may include magnesium (Mg), boron (B), aluminum (Al), gallium (Ga), indium (In), silicon (Si), germanium (Ge), tin (Sn), lead (Pb), bismuth (Bi), cadmium (Cd), silver (Ag), zinc (Zn), hafnium (Hf), zirconium (Zr), yttrium (Y), palladium (Pd), and platinum (Pt). In particular, silicon, tin, or both may be preferable, since silicon and tin have a superior ability of inserting and extracting lithium, and therefore, provide high energy density.

A material containing silicon, tin, or both as constituent elements may be any of a simple substance of silicon, an alloy of silicon, a compound of silicon, a simple substance of tin, an alloy of tin, and a compound of tin, or may be two or more thereof. In addition thereto, a material having one or more phases of the foregoing simple substance of silicon and the like in part or all thereof may be used. However, the term "simple substance" described here merely refers to a general simple substance (a small amount of impurity may be therein contained), and does not necessarily refer to a purity 100% simple substance.

The alloys of silicon may contain, for example, any one or more of elements such as tin (Sn), nickel (Ni), copper (Cu), iron (Fe), cobalt (Co), manganese (Mn), zinc (Zn), indium (In), silver (Ag), titanium (Ti), germanium (Ge), bismuth (Bi), antimony (Sb), and chromium (Cr) as constituent elements other than silicon. The compounds of silicon may contain, for example, any one or more of carbon (C), oxygen (O), and the like as constituent elements other than silicon. It is to be noted that, for example, the compounds of silicon may contain any one or more of the elements described for the alloys of silicon as constituent elements other than silicon.

Specific examples of the alloys of silicon and the compounds of silicon may include $SiB_4$, $SiB_6$, $Mg_2Si$, $Ni_2Si$, $TiSi_2$, $MoSi_2$, $CoSi_2$, $NiSi_2$, $CaSi_2$, $CrSi_2$, $Cu_5Si$, $FeSi_2$, $MnSi_2$, $NbSi_2$, $TaSi_2$, $VSi_2$, $WSi_2$, $ZnSi_2$, $SiC$, $Si_3N_4$, $Si_2N_2O$, $SiO_v$ ($0 \leq v \leq 2$), and LiSiO. It is to be noted that v in $SiO_v$ may be in the range of $0.2 < v < 1.4$.

The alloys of tin may contain, for example, any one or more of elements such as silicon (Si), nickel (Ni), copper (Cu), iron (Fe), cobalt (Co), manganese (Mn), zinc (Zn), indium (In), silver (Ag), titanium (Ti), germanium (Ge), bismuth (Bi), antimony (Sb), and chromium (Cr) as constituent elements other than tin. The compounds of tin may contain, for example, any one or more of elements such as carbon and oxygen as constituent elements other than tin. It is to be noted that the compounds of tin may contain, for example, any one or more of elements described for the alloys of tin as constituent elements other than tin.

Specific examples of the alloys of tin and the compounds of tin may include $SnO_w$ ($0 < w \leq 2$), $SnSiO_3$, LiSnO, and $Mg_2Sn$.

In particular, as a material containing tin as a constituent element, for example, a material containing a second constituent element and a third constituent element together with a first constituent element (tin) may be preferable. Examples of the second constituent element may include any one or more of cobalt (Co), iron (Fe), magnesium (Mg), titanium (Ti), vanadium (V), chromium (Cr), manganese (Mn), nickel (Ni), copper (Cu), zinc (Zn), gallium (Ga), zirconium (Zr), niobium (Nb), molybdenum (Mo), silver (Ag), indium (In), cesium (Ce), hafnium (Hf), tantalum (Ta), tungsten (W), bismuth (Bi), and silicon (Si). Examples of the third constituent element may include any one or more of boron (B), carbon (C), aluminum (Al), phosphorus (P), and the like. In the case where the second constituent element and the third constituent element are contained, a high battery capacity, superior cycle characteristics, and the like are obtained.

In particular, a material (an SnCoC-containing material) containing tin, cobalt, and carbon as constituent elements may be preferable. The carbon content may be, for example, from 9.9 mass % to 29.7 mass % both inclusive, and the ratio of tin and cobalt contents (Co/(Sn+Co)) may be, for example, from 20 mass % to 70 mass % both inclusive, since thereby, high energy density is obtained.

It may be preferable that the SnCoC-containing material have a phase containing tin, cobalt, and carbon. Such a phase may be preferably low-crystalline or amorphous. The phase is a reaction phase capable of reacting with lithium. Therefore, due to existence of the reaction phase, superior characteristics are obtained. The half bandwidth (diffraction angle 2θ) of the diffraction peak obtained by X-ray diffraction of the reaction phase may be preferably equal to or greater than 1 deg in the case where CuKα ray is used as a specific X ray, and the insertion rate is 1 deg/min. Thereby, lithium is more smoothly inserted and extracted, and reactivity with the electrolytic solution is decreased. It is to be noted that, in some cases, the SnCoC-containing material includes a phase containing a simple substance or part of the respective constituent elements in addition to the low-crystalline phase or the amorphous phase.

Whether or not the diffraction peak obtained by the X-ray diffraction corresponds to the reaction phase capable of reacting with lithium is allowed to be easily determined by comparison between X-ray diffraction charts before and after electrochemical reaction with lithium. For example, if the position of the diffraction peak after electrochemical reaction with lithium is changed from the position of the diffraction peak before the electrochemical reaction with lithium, the obtained diffraction peak corresponds to the reaction phase capable of reacting with lithium. In this case, for example, the diffraction peak of the low crystalline reaction phase or the amorphous reaction phase may be seen in the range of 2θ=from 20 deg to 50 deg both inclusive. Such a reaction phase may have, for example, the foregoing respective constituent elements, and the low crystalline or amorphous structure thereof possibly results from existence of carbon mainly.

In the SnCoC-containing material, part or all of carbon as a constituent element may be preferably bonded to a metal element or a metalloid element as other constituent element, since cohesion or crystallization of tin and/or the like is suppressed thereby. The binding state of elements is allowed to be checked with the use, for example, of X-ray photoelectron spectroscopy (XPS). In a commercially available device, for example, as a soft X ray, Al-Kα ray, Mg-Kα ray, or the like may be used. In the case where part or all of carbon are bound to a metal element, a metalloid element, or the like, the peak of a synthetic wave of 1 s orbit of carbon (C1s) is shown in a region lower than 284.5 eV. It is to be noted that in the device, energy calibration is made so that the peak of 4f orbit of gold atom (Au4f) is obtained in 84.0 eV. At this time, in general, since surface contamination carbon exists on the material surface, the peak of C1s of the surface contamination carbon is regarded as 284.8 eV, which is used as the energy standard. In XPS measurement, the waveform of the peak of C1s is obtained as a form including the peak of the surface contamination carbon and the peak of carbon in the SnCoC-containing material. Therefore, for example, analysis may be made with the use of commercially available software to isolate both peaks from each other. In the waveform analysis, the position of the main peak existing on the lowest bound energy side is the energy standard (284.8 eV).

It is to be noted that the SnCoC-containing material is not limited to the material (SnCoC) whose constituent elements are only tin (Sn), cobalt (Co), and carbon (C). The SnCoC-containing material may further contain, for example, any one or more of silicon (Si), iron (Fe), nickel (Ni), chromium (Cr), indium (In), niobium (Nb), germanium (Ge), titanium (Ti), molybdenum (Mo), aluminum (Al), phosphorus (P), gallium (Ga), bismuth (Bi), and the like as constituent elements in addition to tin (Sn), cobalt (Co), and carbon (C).

In addition to the SnCoC-containing material, a material (an SnCoFeC-containing material) containing tin (Sn), cobalt (Co), iron (Fe), and carbon (C) as constituent elements may be also preferable. The composition of the SnCoFeC-containing material may be arbitrarily set. For example, the composition in which the iron content may be set small is as follows. That is, the carbon content may be from 9.9 mass % to 29.7 mass % both inclusive, the iron content may be from 0.3 mass % to 5.9 mass % both inclusive, and the ratio (Co/(Sn+Co)) of contents of tin and cobalt may be from 30 mass % to 70 mass % both inclusive. Further, the composition in which the iron content is set large is as follows. That is, the carbon content may be from 11.9 mass % to 29.7 mass % both inclusive, the ratio ((Co+Fe)/(Sn+Co+Fe)) of contents of tin, cobalt, and iron may be from 26.4 mass % to 48.5 mass % both inclusive, and the ratio (Co/(Co+Fe)) of contents of cobalt and iron may be from 9.9 mass % to 79.5 mass % both inclusive. In such a composition range, high energy density is obtained. It is to be noted that physicality (such as half bandwidth) of the SnCoFeC-containing material is similar to the physicality of the foregoing SnCoC-containing material.

In addition thereto, the anode material may be, for example, any one or more of metal oxides, polymer compounds, and the like. Examples of the metal oxides may include iron oxide, ruthenium oxide, and molybdenum oxide. Examples of the polymer compounds may include polyacetylene, polyaniline, and polypyrrole.

The anode active material layer 14B may be formed, for example, by any one or more of a coating method, a vapor-phase deposition method, a liquid-phase deposition method, a spraying method, a firing method (a sintering method), and the like. The coating method may be a method in which, for example, after a particulate (powder) anode active material is mixed with an anode binder and/or the like, the resultant mixture is dispersed in a solvent such as an organic solvent, and the anode current collector 14A is coated with the resultant. Examples of the vapor-phase deposition method may include a physical deposition method and a chemical deposition method. More specifically, examples thereof may include a vacuum evaporation method, a sputtering method, an ion plating method, a laser ablation method, a thermal chemical vapor deposition method, a chemical vapor deposition (CVD) method, and a plasma chemical vapor deposition method. Examples of the liquid-phase deposition method may include an electrolytic plating method and an electroless plating method. The spraying method is a method in which an anode active material in a fused state or a semi-fused state is sprayed to the anode current collector 14A. The firing method may be a method in which after the anode current collector 14A is coated with a mixture dispersed in a solvent with the use, for example, of a coating method, heat treatment is performed at temperature higher than the melting point of the anode binder and/or the like. As the firing method, for example, an atmosphere firing method, a reactive firing method, a hot press firing method, or the like may be used.

In the secondary battery, as described above, in order to prevent lithium metal from being unintentionally precipitated on the anode 14 in the middle of charge, the electrochemical equivalent of the anode material capable of inserting and extracting lithium may be preferably larger than the electrochemical equivalent of the cathode. Further, in the case where the open circuit voltage (that is, a battery voltage) at the time of fully-charged state is equal to or greater than 4.25 V, the extraction amount of lithium per unit mass is large compared to that in the case where the open circuit voltage is 4.20 V even if the same cathode active material is used. Therefore, amounts of the cathode active material and the anode active material are adjusted accordingly in order to obtain high energy density.

[1-1-3. Separator]

The separator 15 separates the cathode 13 from the anode 14, and passes lithium ions while preventing current short circuit resulting from contact of both electrodes. The separator 15 may be, for example, any one or more of porous films made of a synthetic resin, ceramics, and/or the like. The separator 15 may be a laminated film in which two or more kinds of porous films are laminated. Examples of the synthetic resin may include polytetrafluoroethylene, polypropylene, and polyethylene.

In particular, the separator 15 may include, for example, a polymer compound layer on a single surface or both surfaces of the foregoing porous film (the base material layer). Thereby, adhesibility of the separator 15 with respect to the cathode 13 and the anode 14 is improved, and therefore, skewness of the spirally wound electrode body 10 is suppressed. Thereby, a decomposition reaction of the electrolytic solution is suppressed, and liquid leakage of the electrolytic solution with which the base material layer is impregnated is suppressed. Accordingly, even if charge and discharge are repeated, the resistance is less likely to be increased, and the secondary battery is less likely to be swollen.

The polymer compound layer may contain, for example, any one or more of polymer compounds such as polyvinylidene fluoride, since such a polymer compound has a superior physical strength and is electrochemically stable. Upon forming the polymer compound layer, for example, after a solution in which the polymer compound is dispersed or dissolved is prepared, the base material layer is coated with the solution. It is to be noted that the base material layer may be soaked in the solution, and the solution may be subsequently dried.

[1-1-4. Electrolyte Layer]

The electrolyte layer 16 contains an electrolytic solution as a liquid electrolyte and a polymer compound. The electrolytic solution is supported by the polymer compound. That is, the electrolyte layer 16 described here is a so-called gel electrolyte, since thereby, high ion conductivity (such as 1 mS/cm or more at room temperature) is obtained and liquid leakage of the electrolytic solution is prevented. It is to be noted that the electrolyte layer 16 may further contain any one or more of other materials such as an additive.

The polymer compound contains any one or more of three-component block copolymers. The "three-component block copolymer" refers to a polymer obtained by polymerization with the use of polymerization units (monomers) categorized into three types. In a main chain of the polymer, the same types of monomers are continued.

Out of the foregoing three types of polymerization units, the first type of polymerization unit is vinylidene fluoride (VDF); the second type of polymerization unit is hexafluoropropene (HFP); and the third type of polymerization unit is any one or more of monomethyl maleate (MMM), trifluoroethylene (TFE), and chlorotrifluoroethylene (CTFE). In the following description, the foregoing term "any one or more of MMM, TFE, and CTFE" will be collectively referred to as "MMM and/or the like."

A combination of polymerization units contained in the three-component block copolymer is not particularly limited, as long as the foregoing three types of polymerization units are included therein. That is, as the combination of polymerization units, a combination of VDF, HFP, and MMM; a combination of VDF, HFP, and TFE; or a combination of VDF, HFP, and CTFE may be used. In addition thereto, a combination of VDF, HFP, MMM, and TFE; a combination of VDF, HFP, MMM, and CTFE; a combination of VDF, HFP, TFE, and CTFE; or a combination of VDF, HFP, MMM, TFE, and CTFE may be used.

The polymer compound contains the three-component block copolymer. One reason for this is that, in this case, physicality of the polymer compound is improved compared to a case in which the polymer compound does not contain the three-component block copolymer. More specifically, in this case, first, flexibility of the polymer compound is improved, and therefore, mechanical strength of the polymer compound is less likely to be lowered. Secondly, affinity of the polymer compound with respect to an electrolytic solution is improved, and therefore, the polymer compound easily supports the electrolytic solution. Thirdly, due to interaction between the foregoing flexibility and the foregoing affinity, lowering of the mechanical strength of the polymer compound is kept at minimum, while the polymer compound easily supports the electrolytic solution. Therefore, since the electrolyte layer 16 stably serves as a conduction medium of lithium ions, lowering of a discharge capacity resulting from lowered physicality of the polymer compound is suppressed even when charge an discharge are repeated.

It is to be noted that the foregoing term "a case in which the polymer compound does not contain the three-component block copolymer" may refer to, for example, a case in which the polymer compound contains a random copolymer, a case in which the polymer compound contains other block copolymer, or the like. Examples of the former random copolymer may include a three-component random copolymer containing VDF, HFP, and MMM and/or the like as polymerization units. Examples of the latter other block copolymer may include a two-component block copolymer that contains only VDF and HFP as polymerization units and does not contain MMM and/or the like.

Out of the chemical structure of the three-component block copolymer, a portion in which the first polymerization units (VDF) are continued is referred to as X; a portion in which the second polymerization units (HFP) are continued is referred to as Y; and a portion in which the third polymerization units (MMM and/or the like) are continued is referred to as Z. In this case, linkage order of X, Y, and Z is not particularly limited. That is, the chemical structure of the three-component block copolymer may be —X—Y—Z—, or may be other structure. One reason for this is that the foregoing advantage is obtained without depending on the linkage order of X, Y, and Z.

Each of contents (copolymerization amounts: wt %) of respective polymerization units in the three-component block copolymer is not particularly limited. In particular, the copolymerization amount of VDF may be preferably larger than the copolymerization amount of HFP, since thereby, the polymer compound is easily gelated. Further, the copolymerization amount of HFP may be preferably larger than the total of respective contents of MMM, TFE, and CTFE, since thereby, the polymer compound easily supports the electrolytic solution.

For examining the copolymerization amounts of the respective polymerization units, for example, the polymer compound may be analyzed with the use of gel permeation chromatography (GPC). In this case, for example, polystyrene is used as a standard sample.

It is to be noted that the three-component block copolymer may have one or more side chains. In other words, one or more substituent groups may be introduced into any one or more of the foregoing three types of polymerization units. Further, one or more substituent groups may be introduced into any one or more of the third polymerization unit. Types of the substituent groups may be selected as appropriate, for example, according to a function desirable to be added to the three-component block copolymer or the like.

In one example, VDF may preferably have any one or more of halogen groups and hydrogen elimination groups described below as substituent groups. The "hydrogen elimination group" may be, for example, any one or more of groups obtained by eliminating one hydrogen group from each of HFP, MMM, TFE, CTFE, methyl acrylate, ethyl acrylate, styrene, butadiene, hexafluoroacetone, ethylene oxide, propylene oxide, acrylonitrile, and metacrylonitrile. One reason for this is that, in this case, a crystalline portion and an amorphous portion coexist in the polymer compound, and therefore, the polymer compound easily supports the electrolytic solution, and mechanical strength of the polymer compound is improved.

Further, one or both of TFE and CTFE may preferably have any one or more of halogen groups and the foregoing hydrogen elimination groups as substituent groups for a reason similar to that of the case in which VDF has a substituent group. Examples of the halogen groups may include a fluorine group (—F), a chlorine group (—Cl), a bromine group (—Br), and an iodine group (—I).

Although the molecular weight (weight-average molecular weight) of the three-component block copolymer is not particularly limited, the molecular weight may be preferably, for example, from about one hundred thousand to about three million, since thereby, solubility and the like are secured.

It is to be noted that the polymer compound may further contain any one or more of other polymers, as long as the polymer compound contains the foregoing three-component block copolymer. As such other polymer, a homopolymer may be used, or a copolymer (excluding a polymer corresponding to the three-component block copolymer) may be used. Examples of the homopolymer may include polyacrylonitrile, polyvinylidene fluoride, polytetrafluoroethylene, polyhexafluoropropylene, polyethylene oxide, polypropylene oxide, polyphosphazene, polysiloxane, polyvinyl fluoride, polyvinyl acetate, polyvinyl alcohol, polymethacrylic acid methyl, polyacrylic acid, polymethacrylic acid, styrene-butadiene rubber, nitrile-butadiene rubber, polystyrene, and polycarbonate. Examples of the copolymer may include a copolymer containing VDF and HFP as polymerization units, since such a copolymer is electrochemically stable.

The electrolytic solution contains a solvent and an electrolyte salt. However, the electrolytic solution may further contain any one or more of other materials such as an additive.

The solvent contains any one or more of non-aqueous solvents such as an organic solvent. The electrolytic solution containing a non-aqueous solvent is a so-called non-aqueous electrolytic solution.

Examples of the non-aqueous solvents may include a cyclic ester carbonate, a chain ester carbonate, lactone, a chain carboxylic ester, and nitrile, since thereby, a superior battery capacity, superior cycle characteristics, superior conservation characteristics, and the like are obtained. Examples of the cyclic ester carbonate may include ethylene carbonate, propylene carbonate, and butylene carbonate. Examples of the chain ester carbonate may include dimethyl carbonate, diethyl carbonate, ethyl methyl carbonate, and methylpropyl carbonate. Examples of the lactone may include γ-butyrolactone and γ-valerolactone. Examples of the carboxylic ester may include methyl acetate, ethyl acetate, methyl propionate, ethyl propionate, methyl butyrate, methyl isobutyrate, methyl trimethylacetate, and ethyl trimethylacetate. Examples of the nitrile may include acetonitrile, glutaronitrile, adiponitrile, methoxyacetonitrile, and 3-methoxypropionitrile.

In addition thereto, examples of the non-aqueous solvents may include 1,2-dimethoxyethane, tetrahydrofuran, 2-methyltetrahydrofuran, tetrahydropyran, 1,3-dioxolane, 4-methyl-1,3-dioxolane, 1,3-dioxane, 1,4-dioxane, N,N-dimethylformamide, N-methylpyrrolidinone, N-methyloxazolidinone, N,N'-dimethylimidazolidinone, nitro methane, nitroethane, sulfolane, trimethyl phosphate, and dimethyl sulfoxide. Thereby, a similar advantage is obtained.

In particular, any one or more of ethylene carbonate, propylene carbonate, dimethyl carbonate, diethyl carbonate, and ethyl methyl carbonate may be preferable, since thereby, a superior battery capacity, superior cycle characteristics, superior conservation characteristics, and the like are obtained. In this case, a combination of a high viscosity (high dielectric constant) solvent (for example, specific dielectric constant $\in \geq 30$) such as ethylene carbonate and propylene carbonate and a low viscosity solvent (for example, viscosity≤1 mPa·s) such as dimethyl carbonate, ethylmethyl carbonate, and diethyl carbonate may be more preferable. One reason for this is that the dissociation property of the electrolyte salt and ion mobility are improved thereby.

In particular, the solvent may contain any one or more of an unsaturated cyclic ester carbonate, a halogenated ester carbonate, sultones (cyclic sulfonic esters), acid anhydrides, and the like, since thereby, chemical stability of the electrolytic solution is improved. The unsaturated cyclic ester carbonate is a cyclic ester carbonate having one or more unsaturated bonds (carbon-carbon double bonds or carbon-carbon triple bonds), and may be, for example, vinylene carbonate, vinylethylene carbonate, methyleneethylene carbonate, or the like. The halogenated ester carbonate is a cyclic ester carbonate or a chain ester carbonate containing one or more halogens as constituent elements. Examples of the cyclic halogenated ester carbonate may include 4-fluoro-1,3-dioxole-2-one, and 4,5-difluoro-1,3-dioxole-2-one. Examples of the chain halogenated ester carbonate may include fluoromethyl methyl carbonate, bis(fluoromethyl) carbonate, and difluoromethyl methyl carbonate. Examples of the sultones may include propane sultone and propene sultone. Examples of the acid anhydrides may include a succinic anhydride, an ethane disulfonic anhydride, and a sulfobenzoic anhydride. However, examples of the solvent may include materials other than the foregoing materials.

The electrolyte salt may contain, for example, any one or more of salts such as lithium salts. However, the electrolyte salt may contain, for example, a salt other than the lithium salt. Examples of the salt other than the lithium salt may include a light metal salt other than lithium.

Examples of the lithium salts may include lithium hexafluorophosphate ($LiPF_6$), lithium tetrafluoroborate ($LiBF_4$), lithium perchlorate ($LiClO_4$), lithium hexafluoroarsenate ($LiAsF_6$), lithium tetraphenylborate ($LiB(C_6H_5)_4$), lithium methanesulfonate ($LiCH_3SO_3$), lithium trifluoromethane sulfonate ($LiCF_3SO_3$), lithium tetrachloroaluminate ($LiAlCl_4$), dilithium hexafluorosilicate ($Li_2SiF_6$), lithium chloride (LiCl), and lithium bromide (LiBr). Thereby, a superior battery capacity, superior cycle characteristics, superior conservation characteristics, and the like are obtained.

In particular, any one or more of $LiPF_6$, $LiBF_4$, $LiClO_4$, and $LiAsF_6$ may be preferable, and $LiPF_6$ may be more preferable, since the internal resistance is thereby lowered, and therefore, a higher effect is obtained. However, examples of the electrolyte salt may include salts other than the foregoing salts.

Although the content of the electrolyte salt is not particularly limited, in particular, the content thereof may be preferably from 0.3 mol/kg to 3.0 mol/kg both inclusive with respect to the solvent, since high ion conductivity is obtained thereby.

[1-2. Operation of Secondary Battery]

The secondary battery may operate, for example, as follows. At the time of charge, when lithium ions are extracted from the cathode 13, the lithium ions are inserted in the anode 14 through the electrolyte layer 16. In contrast, at the time of discharge, when lithium ions are extracted from the anode 14, the lithium ions are inserted in the cathode 13 through the electrolyte layer 16.

[1-3. Manufacturing Method of Secondary Battery]

The secondary battery including the electrolyte layer 16 may be manufactured, for example, by the following three procedures.

In the first procedure, first, the cathode 13 and the anode 14 are fabricated.

Upon fabricating the cathode 13, first, a cathode active material is mixed with a cathode binder, a cathode electric conductor, and the like to prepare a cathode mixture. Subsequently, the cathode mixture is dispersed or dissolved in an organic solvent or the like to obtain paste cathode mixture slurry. Finally, both surfaces of the cathode current collector 13A are coated with the cathode mixture slurry, and the cathode mixture slurry is dried to form the cathode active material layer 13B. Thereafter, the cathode active material layer 13B may be compression-molded with the use of a roll pressing machine and/or the like. In this case, compression-molding treatment may be performed while heating the cathode active material layer 13B, or compression-molding treatment of the cathode active material layer 13B may be repeated several times.

Upon fabricating the anode 14, the anode active material layer 14B is formed on both surfaces of the anode current collector 14A by a fabrication procedure similar to that of the foregoing cathode 13. Specifically, an anode mixture obtained by mixing an anode active material, an anode binder, an anode electric conductor, and the like is dispersed or dissolved in an organic solvent or the like to form paste anode mixture slurry. Subsequently, both surfaces of the anode current collector 14A are coated with the anode mixture slurry, and the anode mixture slurry is dried to form the anode active material layer 14B. Thereafter, the anode active material layer 14B may be compression-molded with the use of a roll pressing machine and/or the like as necessary.

Subsequently, after an electrolytic solution, a polymer compound containing a three-component block copolymer, and a solvent such as an organic solvent are mixed, the resultant mixture is stirred to prepare a sol precursor solution. The three-component block copolymer may be formed with the use of any one or more of known polymerization actions. Examples of the known polymerization actions may include a radical polymerization action, an anion polymerization action, and an ion copolymerization action. Subsequently, the cathode 13 and the anode 14 are coated with a precursor solution, and thereafter, the precursor solution is dried to form the gel electrolyte layer 16. Subsequently, the cathode lead 11 is attached to the cathode current collector 13A with the use of a welding method and/or the like, and the anode lead 12 is attached to the anode current collector 14A with the use of a welding method and/or the like. Subsequently, the cathode 13 and the anode 14 are layered with the separator 15 and the electrolyte layer 16 in between and the resultant laminated body is spirally wound to fabricate the spirally wound electrode body 10. Thereafter, the protective tape 17 is adhered to the outermost periphery of the spirally wound electrode body 10. Subsequently, after the spirally wound electrode body 10 is sandwiched between two pieces of film-like outer package members 20, the outer edges of the outer package members 20 are adhered with the use of a thermal fusion bonding method and/or the like. Thereby, the spirally wound electrode body 10 is enclosed into the outer package members 20. In this case, the adhesive films 21 are inserted between the cathode lead 11 and the outer package member 20 and between the anode lead 12 and the outer package member 20.

In the second procedure, the cathode lead 11 is attached to the cathode 13, and the anode lead 12 is attached to the anode 14. Subsequently, the cathode 13 and the anode 14 are layered with the separator 15 in between and the resultant laminated body is spirally wound to fabricate a spirally wound body as a precursor of the spirally wound electrode body 10. Thereafter, the protective tape 17 is adhered to the outermost periphery of the spirally wound body. Subsequently, after the spirally wound body is arranged between two pieces of film-like outer package members 20, the outermost peripheries except for one side are bonded with the use of a thermal fusion bonding method and/or the like to obtain a pouched state, and the spirally wound body is contained in the pouch-like outer package member 20. Subsequently, a composition for electrolyte containing an electrolytic solution, a monomer as a raw material for the polymer compound, a polymerization initiator, and other materials such as a polymerization inhibitor is prepared. Subsequently, the composition for electrolyte is injected into the pouch-like outer package member 20. Thereafter, the outer package member 20 is hermetically sealed with the use of a thermal fusion bonding method and/or the like. Subsequently, the monomer is thermally polymerized, and thereby, a polymer compound is formed. Accordingly, the polymer compound is impregnated with the electrolytic solution, and the polymer compound is gelated, and therefore, the electrolyte layer 16 is formed.

In the third procedure, the spirally wound body is fabricated and contained in the pouch-like outer package member 20 in a manner similar to that of the foregoing second procedure, except that the separator 15 with both surfaces coated with a polymer compound layers is used. Examples of the polymer compound with which the separator 15 is coated may include a polymer (a homopolymer, a copolymer, or a multicomponent copolymer) containing VDF as a component. Specific examples of the homopolymer may include polyvinylidene fluoride. Examples of the copolymer may include a binary copolymer containing VDF and HFP as components. Examples of the multicomponent copolymer may include a ternary copolymer containing VDF, HFP, and CTFE as components. It is to be noted that, together with the polymer containing VDF as a component, other one or more polymer compounds may be used. Subsequently, an electrolytic solution is prepared and injected into the outer package member 20. Thereafter, the opening of the outer package member 20 is hermetically sealed with the use of a thermal fusion bonding method and/or the like. Subsequently, the resultant is heated while a weight is applied to the outer package member 20, and the separator 15 is adhered to the cathode 13 and the anode 14 with the polymer compound layer in between. Thereby, the polymer compound in the polymer compound layer is impregnated with the electrolytic solution, and accordingly, the polymer compound is gelated to form the electrolyte layer 16.

In the third procedure, swollenness of the secondary battery is suppressed more than in the first procedure. Further, in the third procedure, the monomer as a raw material of the polymer compound, the solvent, and the like are less likely to be left in the electrolyte layer 16 compared to in the second procedure. Therefore, the formation step of the polymer compound is favorably controlled. Therefore, sufficient adhesiveness is obtained between the cathode 13, the anode 14, and the separator 15, and the electrolyte layer 16.

[1-4. Function and Effect of Secondary Battery]

According to the secondary battery, the polymer compound in the electrolyte layer 16 contains the three-component block copolymer. In this case, as described above, flexibility of the polymer compound is improved, and affinity of the polymer compound with respect to the electrolytic solution is improved, and therefore, the polymer compound easily supports the electrolytic solution while lowering of mechanical strength of the polymer compound is kept at minimum resulting from the synergic action. Therefore, even when charge and discharge are repeated, lowering of a discharge capacity resulting from lowering of physicality of the polymer compound is suppressed, and therefore, superior battery characteristics are obtainable.

[2. Applications of Secondary Battery]

Next, applications of the foregoing secondary battery will be described.

Applications of the secondary battery are not particularly limited as long as the secondary battery is applied to a machine, a device, an instrument, an apparatus, a system (collective entity of a plurality of devices and the like), or the like that is allowed to use the secondary battery as a driving electric power source, an electric power storage source for electric power storage, or the like. The secondary battery used as an electric power source may be a main electric power source (electric power source used preferentially), or may be an auxiliary electric power source (electric power source used instead of a main electric power source or used being switched from the main electric power source). In the case where the secondary battery is used as an auxiliary electric power source, the main electric power source type is not limited to the secondary battery.

Examples of applications of the secondary battery may include electronic apparatuses (including portable electronic apparatuses) such as a video camcorder, a digital still camera, a mobile phone, a notebook personal computer, a cordless phone, a headphone stereo, a portable radio, a portable television, and a personal digital assistant. Further examples thereof may include a mobile lifestyle electric appliance such as an electric shaver; a memory device such as a backup electric power source and a memory card; an electric power tool such as an electric drill and an electric saw; a battery pack used for a notebook personal computer or the like as an attachable and detachable electric power source; a medical electronic apparatus such as a pacemaker and a hearing aid; an electric vehicle such as an electric automobile (including a hybrid automobile); and an electric power storage system such as a home battery system for storing electric power for emergency or the like. It goes without saying that an application other than the foregoing applications may be adopted.

In particular, the secondary battery is effectively applicable to the battery pack, the electric vehicle, the electric power storage system, the electric power tool, the electronic apparatus, or the like. One reason for this is that, in these applications, since superior battery characteristics are demanded, performance is effectively improved with the use of the secondary battery according to the embodiment of the present application. It is to be noted that the battery pack is an electric power source using a secondary battery, and is a so-called assembled battery or the like. The electric vehicle is a vehicle that works (runs) with the use of a secondary battery as a driving electric power source. As described above, the electric vehicle may be an automobile (such as a hybrid automobile) including a drive source other than a secondary battery. The electric power storage system is a system using a secondary battery as an electric power storage source. For example, in a home electric power storage system, since electric power is stored in the secondary battery as an electric power storage source, the electric power is utilized, and thereby, home electric products and the like become usable. The electric power tool is a tool in which a movable section (such as a drill) is moved with the use of a secondary battery as a driving electric power source. The electronic apparatus is an apparatus executing various functions with the use of a secondary battery as a driving electric power source (electric power supply source).

Description will be specifically given of some application examples of the secondary battery. It is to be noted that the configurations of the respective application examples explained below are merely examples, and may be changed as appropriate.

[2-1. Battery Pack]

Figure 3:
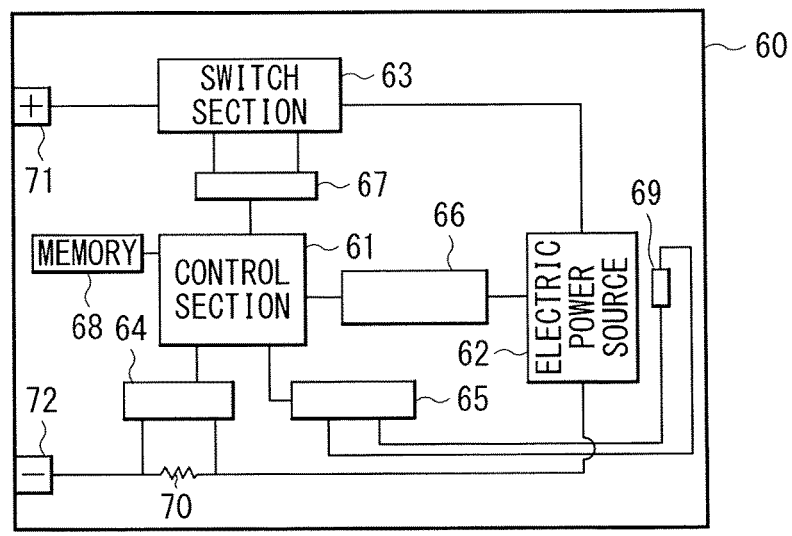
FIG. 3 is a block diagram illustrating a configuration of an application example (a battery pack) of the secondary battery.

FIG. 3 illustrates a block configuration of a battery pack. For example, the battery pack may include a control section 61, an electric power source 62, a switch section 63, a current measurement section 64, a temperature detection section 65, a voltage detection section 66, a switch control section 67, a memory 68, a temperature detection element 69, a current detection resistance 70, a cathode terminal 71, and an anode terminal 72 in a housing 60 made of a plastic material and/or the like.

The control section 61 controls operation of the whole battery pack (including operation of the electric power source 62), and may include, for example, a central processing unit (CPU) and/or the like. The electric power source 62 includes one or more secondary batteries (not illustrated). The electric power source 62 may be, for example, an assembled battery including two or more secondary batteries. Connection type of these secondary batteries may be a series-connected type, may be a parallel-connected type, or a mixed type thereof. As an example, the electric power source 62 may include six secondary batteries connected in a manner of dual-parallel and three-series.

The switch section 63 switches the operation of the electric power source 62 (whether or not the electric power source 62 is connectable to an external device) according to an instruction of the control section 61. The switch section

63 may include, for example, a charge control switch, a discharge control switch, a charging diode, a discharging diode, and the like (not illustrated). The charge control switch and the discharge control switch may each be, for example, a semiconductor switch such as a field-effect transistor (MOSFET) using a metal oxide semiconductor.

The current measurement section 64 measures a current with the use of the current detection resistance 70, and outputs the measurement result to the control section 61. The temperature detection section 65 measures temperature with the use of the temperature detection element 69, and outputs the measurement result to the control section 61. The temperature measurement result may be used for, for example, a case in which the control section 61 controls charge and discharge at the time of abnormal heat generation or a case in which the control section 61 performs a correction processing at the time of calculating a remaining capacity. The voltage detection section 66 measures a voltage of the secondary battery in the electric power source 62, performs analog-to-digital conversion on the measured voltage, and supplies the resultant to the control section 61.

The switch control section 67 controls operations of the switch section 63 according to signals inputted from the current measurement section 64 and the voltage detection section 66.

The switch control section 67 executes control so that a charging current is prevented from flowing in a current path of the electric power source 62 by disconnecting the switch section 63 (charge control switch) in the case where, for example, a battery voltage reaches an overcharge detection voltage. Thereby, in the electric power source 62, only discharge is allowed to be performed through the discharging diode. It is to be noted that, for example, in the case where a large current flows at the time of charge, the switch control section 67 blocks the charging current.

Further, the switch control section 67 executes control so that a discharging current is prevented from flowing in the current path of the electric power source 62 by disconnecting the switch section 63 (discharge control switch) in the case where, for example, a battery voltage reaches an overdischarge detection voltage. Thereby, in the electric power source 62, only charge is allowed to be performed through the charging diode. It is to be noted that, for example, in the case where a large current flows at the time of discharge, the switch control section 67 blocks the discharging current.

It is to be noted that, in the secondary battery, for example, the overcharge detection voltage may be 4.20 V±0.05 V, and the over-discharge detection voltage may be 2.4 V±0.1 V.

The memory 68 may be, for example, an EEPROM as a non-volatile memory or the like. The memory 68 may store, for example, numerical values calculated by the control section 61, information of the secondary battery measured in a manufacturing step (such as an internal resistance in the initial state), and the like. It is to be noted that, in the case where the memory 68 stores a full charging capacity of the secondary battery, the control section 61 is allowed to comprehend information such as a remaining capacity.

The temperature detection element 69 measures temperature of the electric power source 62, and outputs the measurement result to the control section 61. The temperature detection element 69 may be, for example, a thermistor or the like.

The cathode terminal 71 and the anode terminal 72 are terminals connected to an external device (such as a notebook personal computer) driven using the battery pack or an external device (such as a battery charger) used for charging the battery pack. The electric power source 62 is charged and discharged through the cathode terminal 71 and the anode terminal 72.

[2-2. Electric Vehicle]

Figure 4:
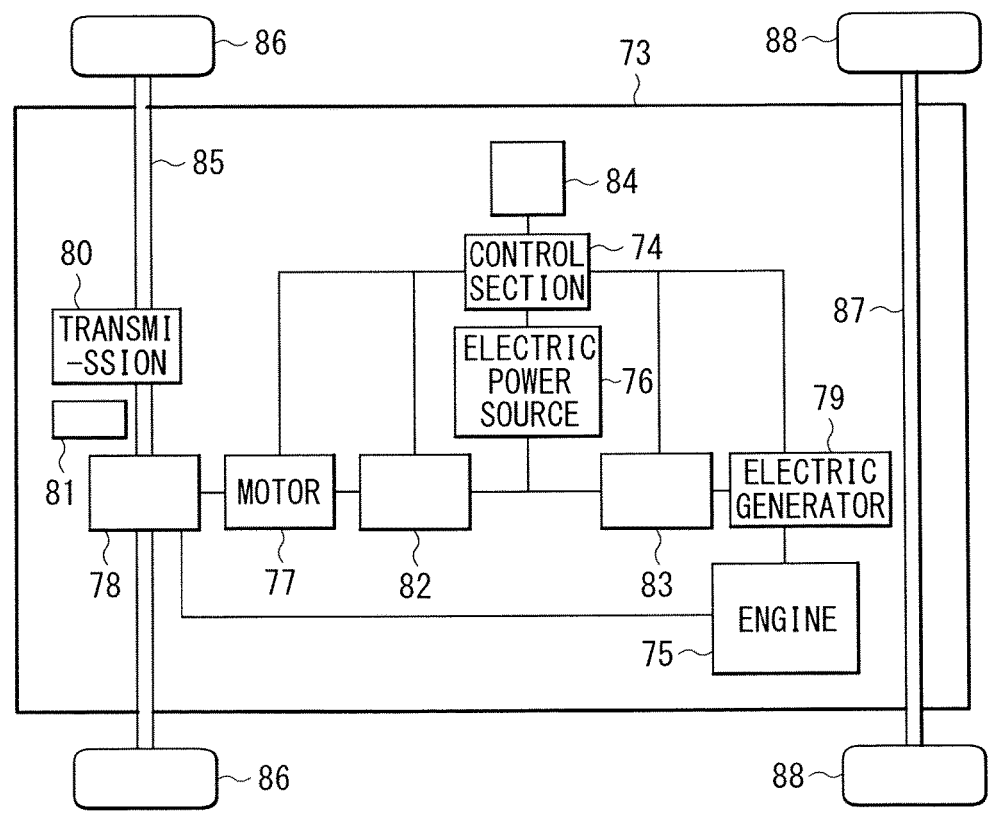
FIG. 4 is a block diagram illustrating a configuration of an application example (an electric vehicle) of the secondary battery.

FIG. 4 illustrates a block configuration of a hybrid automobile as an example of electric vehicles. For example, the electric vehicle may include a control section 74, an engine 75, an electric power source 76, a driving motor 77, a differential 78, an electric generator 79, a transmission 80, a clutch 81, inverters 82 and 83, and various sensors 84 in a housing 73 made of metal. In addition thereto, the electric vehicle may include, for example, a front drive shaft 85 and a front tire 86 that are connected to the differential 78 and the transmission 80, a rear drive shaft 87, and a rear tire 88.

The electric vehicle may run with the use, for example, of one of the engine 75 and the motor 77 as a drive source. The engine 75 is a main power source, and may be, for example, a petrol engine. In the case where the engine 75 is used as a power source, drive power (torque) of the engine 75 may be transferred to the front tire 86 or the rear tire 88 through the differential 78, the transmission 80, and the clutch 81 as drive sections, for example. The torque of the engine 75 may also be transferred to the electric generator 79. Due to the torque, the electric generator 79 generates alternating-current electric power. The alternating-current electric power is converted into direct-current electric power through the inverter 83, and the converted power is stored in the electric power source 76. In contrast, in the case where the motor 77 as a conversion section is used as a power source, electric power (direct-current electric power) supplied from the electric power source 76 is converted into alternating-current electric power through the inverter 82. The motor 77 may be driven by the alternating-current electric power. Drive power (torque) obtained by converting the electric power by the motor 77 may be transferred to the front tire 86 or the rear tire 88 through the differential 78, the transmission 80, and the clutch 81 as the drive sections, for example.

It is to be noted that, alternatively, the following mechanism may be adopted. In the mechanism, when speed of the electric vehicle is reduced by an unillustrated brake mechanism, the resistance at the time of speed reduction is transferred to the motor 77 as torque, and the motor 77 generates alternating-current electric power by the torque. It may be preferable that the alternating-current electric power be converted to direct-current electric power through the inverter 82, and the direct-current regenerative electric power be stored in the electric power source 76.

The control section 74 controls operations of the whole electric vehicle, and, for example, may include a CPU and/or the like. The electric power source 76 includes one or more secondary batteries (not illustrated). Alternatively, the electric power source 76 may be connected to an external electric power source, and electric power may be stored by receiving the electric power from the external electric power source. The various sensors 84 may be used, for example, for controlling the number of revolutions of the engine 75 or for controlling opening level (throttle opening level) of an unillustrated throttle valve. The various sensors 84 may include, for example, a speed sensor, an acceleration sensor, an engine frequency sensor, and/or the like.

It is to be noted that the description has been given above of the hybrid automobile as an electric vehicle. However, examples of the electric vehicles may include a vehicle (electric automobile) working with the use of only the electric power source 76 and the motor 77 without using the engine 75.

[2-3. Electric Power Storage System]

Figure 5:
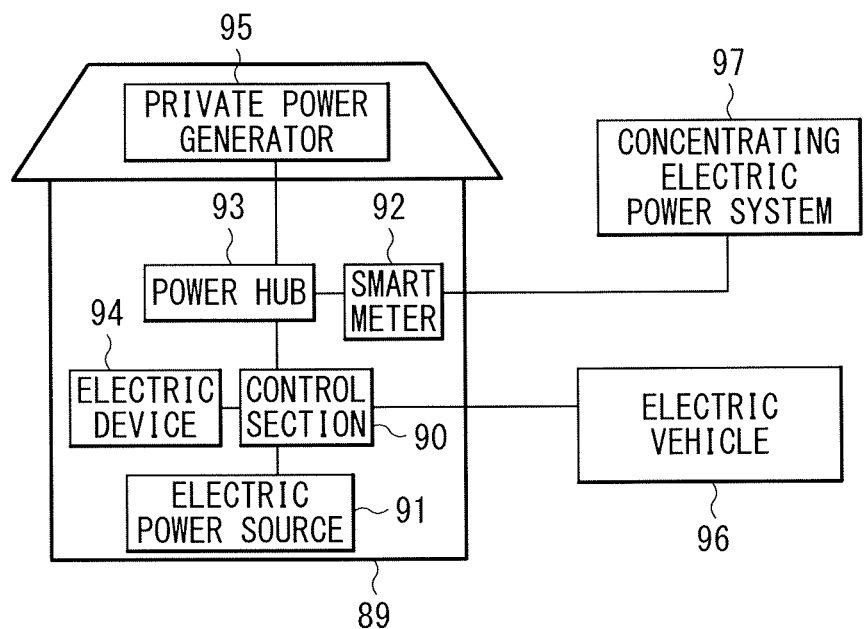
FIG. 5 is a block diagram illustrating a configuration of an application example (an electric power storage system) of the secondary battery.

FIG. 5 illustrates a block configuration of an electric power storage system. For example, the electric power storage system may include a control section 90, an electric power source 91, a smart meter 92, and a power hub 93 inside a house 89 such as a general residence and a commercial building.

In this case, the electric power source 91 may be connected to, for example, an electric device 94 arranged inside the house 89, and may be connected to an electric vehicle 96 parked outside the house 89. Further, for example, the electric power source 91 may be connected to a private power generator 95 arranged inside the house 89 through the power hub 93, and may be connected to an external concentrating electric power system 97 thorough the smart meter 92 and the power hub 93.

It is to be noted that the electric device 94 may include, for example, one or more home electric appliances such as a refrigerator, an air conditioner, a television, and a water heater. The private power generator 95 may be, for example, any one or more of a solar power generator, a wind-power generator, and the like. The electric vehicle 96 may be, for example, any one or more of an electric automobile, an electric motorcycle, a hybrid automobile, and the like. The concentrating electric power system 97 may be, for example, any one or more of a thermal power plant, an atomic power plant, a hydraulic power plant, a wind-power plant, and the like.

The control section 90 controls operation of the whole electric power storage system (including operation of the electric power source 91), and, for example, may include a CPU and/or the like. The electric power source 91 includes one or more secondary batteries (not illustrated). The smart meter 92 may be, for example, an electric power meter compatible with a network arranged in the house 89 demanding electric power, and may be communicable with an electric power supplier. Accordingly, for example, while the smart meter 92 communicates with outside, the smart meter 92 controls the balance between supply and demand in the house 89 and allows effective and stable energy supply.

In the electric power storage system, for example, electric power may be stored in the electric power source 91 from the concentrating electric power system 97 as an external electric power source through the smart meter 92 and the power hub 93, and electric power may be stored in the electric power source 91 from the private power generator 95 as an independent electric power source through the power hub 93. The electric power stored in the electric power source 91 is supplied to the electric device 94 or to the electric vehicle 96 according to an instruction of the control section 90. Therefore, the electric device 94 becomes operable, and the electric vehicle 96 becomes chargeable. That is, the electric power storage system is a system capable of storing and supplying electric power in the house 89 with the use of the electric power source 91.

The electric power stored in the electric power source 91 is arbitrarily usable. Therefore, for example, electric power is allowed to be stored in the electric power source 91 from the concentrating electric power system 97 in the middle of the night when an electric rate is inexpensive, and the electric power stored in the electric power source 91 is allowed to be used during daytime hours when an electric rate is expensive.

It is to be noted that the foregoing electric power storage system may be arranged for each household (family unit), or may be arranged for a plurality of households (family units).

[2-4. Electric Power Tool]

Figure 6:
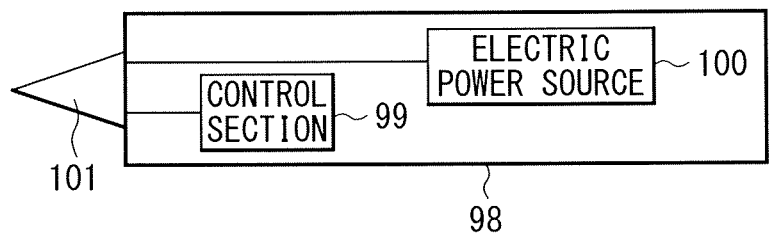
FIG. 6 is a block diagram illustrating a configuration of an application example (an electric power tool) of the secondary battery.

FIG. 6 illustrates a block configuration of an electric power tool. For example, the electric power tool may be an electric drill, and may include a control section 99 and an electric power source 100 in a tool body 98 made of a plastic material and/or the like. For example, a drill section 101 as a movable section may be attached to the tool body 98 in an operable (rotatable) manner.

The control section 99 controls operations of the whole electric power tool (including operation of the electric power source 100), and may include, for example, a CPU and/or the like. The electric power source 100 includes one or more secondary batteries (not illustrated). The control section 99 allows electric power to be supplied from the electric power source 100 to the drill section 101 according to operation of an unillustrated operation switch to operate the drill section 101.

EXAMPLES

Specific examples according to the embodiment of the present application will be described in detail.

Examples 1 to 14

Figure 7:
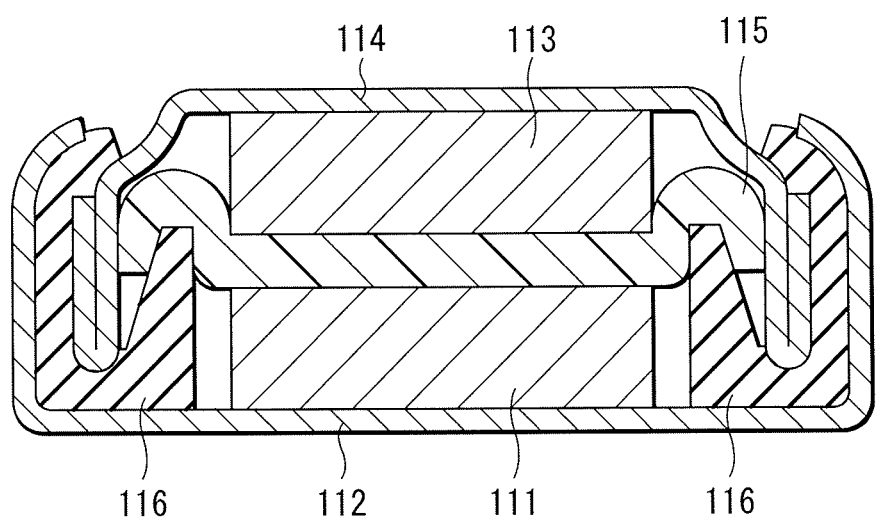
FIG. 7 is a cross-sectional view illustrating a configuration of a test-use secondary battery (a coin-type secondary battery).

As a test-use secondary battery, a coin-type lithium ion secondary battery illustrated in FIG. 7 was fabricated. In the secondary battery, a test electrode 111 and a counter electrode 113 were laminated with a separator 115 in between, and a package can 112 containing the test electrode 111 and a package cup 114 containing the counter electrode 113 were swaged with a gasket 116.

Upon fabricating the test electrode 111, first, 98 parts by mass of a cathode active material ($LiCoO_2$), 1.2 parts by mass of a cathode binder (polyvinylidene fluoride), and 0.8 parts by mass of a cathode electric conductor (graphite) were mixed to obtain a cathode mixture. Subsequently, the cathode mixture was dispersed in an organic solvent (N-methyl-2-pyrrolidone) to obtain paste-like cathode mixture slurry. Subsequently, a single surface of a cathode current collector (a strip-shaped aluminum foil being 12 μm thick) was coated with the cathode mixture slurry with the use of an applicator, and thereafter, the cathode mixture slurry was dried to form a cathode active material layer. In this case, the area density of the cathode active material layer was 26.5 $mg/cm^2$. Finally, the cathode active material layer was pressure-molded with the use of a roll pressing machine. In this case, the volume density of the cathode active material layer was 3.8 $g/cm^3$.

Upon fabricating the counter electrode 113, 92.5 parts by mass of an anode active material (artificial graphite), 4.5 parts by mass of an anode binder (polyvinylidene fluoride), and 3 parts by mass of an anode electric conductor (vapor-grown carbon fiber) were mixed to obtain an anode mixture. Subsequently, the anode mixture was dispersed in an organic solvent (N-methyl-2-pyrrolidone) to obtain paste-like anode mixture slurry. Subsequently, a single surface of an anode current collector (a strip-shaped copper foil being 10 μm thick) was coated with the anode mixture slurry with the use of an applicator, and thereafter, the anode mixture slurry was dried to form an anode active material layer. In this case, the area density of the anode active material layer was 13.6 $mg/cm^2$. Finally, the anode active material layer was pressure-molded with the use of a roll pressing machine. In this case, the volume density of the anode active material layer was 1.6 $g/cm^3$.

Upon forming the electrolyte layer, first, an electrolytic solution was prepared by dissolving an electrolyte salt (LiPF$_6$) in a solvent (ethylene carbonate, propylene carbonate, and dimethyl carbonate). In this case, the composition of the solvent was ethylene carbonate:propylene carbonate:dimethyl carbonate=25:25:50 at a weight ratio, and the content of the electrolyte salt was 1 mol/kg with respect to the solvent. Subsequently, 95 parts by mass of the electrolytic solution and 5 parts by mass of a polymer compound were mixed to prepare a mixed solution. The composition of the polymer compound (types of polymerization units and copolymerization amounts of the respective polymerization units: wt %) and categorization (a block copolymer or a random copolymer) were as illustrated in Table 1. Subsequently, the mixed solution was treated with the use of a homogenizer to uniformly disperse the polymer compound in the electrolytic solution. Thereafter, the mixed solution was stirred while heating (at 75 deg C.) to obtain a sol precursor solution. In this case, stirring was continued until color of the mixed solution was changed into solid color. Finally, respective surfaces of the test electrode 111 (the cathode active material layer) and the counter electrode 113 (the anode active material layer) were coated with the precursor solution. Thereafter, the test electrode 111 and the counter electrode 113 that are coated with the precursor solution were dried (at 90 deg C. for 2 minutes) to form the electrolyte layer. In this case, coating speed of the precursor solution was 20 m/min.

Upon assembling the secondary battery, first, after the test electrode 111 in which the electrolyte layer was formed was punched out into a pellet, the test electrode 111 was contained in the package can 112. Subsequently, after the counter electrode 113 in which the electrolyte layer was formed was punched out into a pellet, the counter electrode 113 was contained in the package cup 114. Finally, after the test electrode 111 contained in the package can 112 and the counter electrode 113 contained in the package cup 114 were layered with the separator 115 (a microporous polyolefin film being 7 μm thick) in between, the package can 112 and the package cup 114 were swaged with the gasket 116. In this case, the electrolyte layer formed in the test electrode 111 and the electrolyte layer formed in the counter electrode 113 were opposed to each other with the separator 115 in between.

As respective characteristics of the electrolyte layer and the secondary battery, mechanical strength characteristics, liquid-retention characteristics, and capacity degradation characteristics were examined. Results illustrated in Table 1 were obtained.

Upon examining the mechanical strength characteristics, first, 10 cm$^3$ (=10 ml) of sol precursor solution was collected in a cup (diameter: 60 mm). Thereafter, the precursor solution was dried (at 45 deg C. for 3 hours) to form an electrolyte layer as a gel electrolyte. Subsequently, the electrolyte layer was applied with a load with the use of a plunger (diameter: 12.7 mm). Finally, as deformation strength ($\times 10^{-3}$ MPa), a load (a stress) when the surface of the electrolyte layer was pressed down 4 mm from the initial position was found.

Upon examining the liquid-retention characteristics, first, an electrolyte layer was formed by a procedure similar to that in the case of examining the mechanical strength characteristics, and thereafter, the weight (weight before applying a load: g) of the electrolyte layer was measured. Subsequently, a syringe with a filter was filled with the electrolyte layer. Subsequently, after the resultant was left for 20 minutes in a state that the load (2 MPa) was applied to the electrolyte layer, the weight (weight after applying the load: g) of the electrolyte layer was measured. From the result, [liquid-retention ratio (%)=(the weight after applying the load−the weight before applying the load)×100] was calculated.

Upon examining the capacity degradation characteristics, degradation speed as an index indicating a tendency that the discharge capacity of the secondary battery is lowered when charge and discharge are repeated was derived based on the following theory. At the time of charge and discharge, lithium ions are reacted with the electrolytic solution on the surface of the anode active material, and therefore, a coat is formed on the surface of the anode active material. In this case, taking account of relation between the formation speed of the coat and the thickness of the coat, it is assumed that the relation thereof complies with "root law (law that the formation speed is inversely related to thicknesses)." Based on such an assumption, the thickness of the coat is proportional to (time)$^{1/2}$, and therefore, a relation that the capacity degradation ratio is similarly proportional to (time)$^{1/2}$ is allowed to be derived. By substituting the (time)$^{1/2}$ by charge and discharge (cycle) of the secondary battery, a slope of capacity degradation with respect to (cycle number)$^{1/2}$ when the secondary battery was charged and discharged at low temperature (at 0 deg C.) was regarded as degradation speed.

Cycle conditions were as follows. At the time of charge, the secondary battery was charged at a constant current of 0.5 C until the voltage reached 4.3 V at low temperature environment (at 0 deg C.), and further, the secondary battery was charged at a voltage of 4.3 V until the total charging time reached 3 hours in the same environment. At the time of discharge, the secondary battery was discharged at a constant current of 0.5 C until the voltage reached 3 V. The cycle number was 50 cycles.

TABLE 1

| | Polymer compound | | | | | | | | |
| | Type of polymerization unit (Copolymerization amount: wt %) | | | | | | Deformation strength | Liquid-retention ratio | Degradation |
| Example | VDF | HFP | MMM | TFE | CTFE | Categorization | ($\times 10^{-3}$ MPa) | (%) | speed |
|---|---|---|---|---|---|---|---|---|---|
| 1 | 96.6 | 3 | 0.4 | — | — | Block | 1.24 | 61.7 | −4.4 |
| 2 | 94.6 | 5 | 0.4 | — | — | Block | 1.23 | 62.3 | −4.5 |
| 3 | 92.6 | 7 | 0.4 | — | — | Block | 1.23 | 64.0 | −4.7 |
| 4 | 89.6 | 10 | 0.4 | — | — | Block | 1.21 | 59.3 | −4.2 |
| 5 | 79.6 | 20 | 0.4 | — | — | Block | 1.20 | 60.8 | −4.4 |
| 6 | 74.6 | 25 | 0.4 | — | — | Block | 1.20 | 61.2 | −4.4 |
| 7 | 91.5 | 7 | — | 1.5 | — | Block | 1.24 | 61.5 | −4.5 |

TABLE 1-continued

| | Polymer compound | | | | | | Liquid- | |
| | Type of polymerization unit (Copolymerization amount: wt %) | | | | | Deformation strength | retention ratio | Degradation speed |
| Example | VDF | HFP | MMM | TFE | CTFE | Categorization | ($\times 10^{-3}$ MPa) | (%) | |
|---|---|---|---|---|---|---|---|---|---|
| 8 | 90 | 7 | — | — | 3 | Block | 1.26 | 60.1 | −4.5 |
| 9 | 91.6 | 7 | 0.4 | — | 1 | Block | 1.24 | 63.8 | −4.6 |
| 10 | 93 | 7 | — | — | — | Block | 1.25 | 45.6 | −3.4 |
| 11 | 92.6 | 7 | 0.4 | — | — | Random | 1.24 | 39.3 | −2.8 |
| 12 | 91.5 | 7 | — | 1.5 | — | Random | 1.27 | 40.0 | −3.0 |
| 13 | 90 | 7 | — | — | 3 | Random | 1.29 | 42.1 | −3.1 |
| 14 | 91.6 | 7 | 0.4 | — | 1 | Random | 1.26 | 38.9 | −2.7 |

As described below, the mechanical strength characteristics, the liquid-retention characteristics, and the capacity degradation characteristics were largely changed according to the composition and the categorization of the polymer compound. In the following description, the deformation strength, the liquid-retention ratio, and the degradation speed when the two-component block copolymer (Example 10) was used were regarded as comparison standards.

When the three-component random copolymers (Examples 11 to 14) were used, compared to the foregoing standards, the deformation strength was substantially equal thereto, while the liquid-retention ratio was largely decreased and the degradation speed was increased.

In contrast, when the three-component block copolymers (Examples 1 to 9) were used, compared to the foregoing standards, the deformation strength was slightly lowered in some cases, while the liquid-retention ratio was largely increased and the degradation speed was largely decreased.

The foregoing result shows the following tendency. In the case where a block copolymer is used and only VDF and HFP are contained as polymerization units, the liquid-retention ratio is not sufficiently large and the degradation speed is not sufficiently suppressed while a high deformation strength is obtained. In contrast, in the case where MMM and/or the like is contained together with VDF and HFP as polymerization units, the liquid-retention ratio is sufficiently increased and the degradation speed is sufficiently suppressed while lowering of the deformation strength is kept at minimum. It is to be noted that in the case where the random copolymer is used and MMM and/or the like is contained together with VDF and HFP, both the liquid-retention ratio and the degradation speed are significantly degraded although a high deformation strength is obtained. Therefore, in order to secure all of the deformation strength, the liquid-retention ratio, and the degradation speed, the block copolymer should be adopted, and the block copolymer should contain MMM and/or the like together with VDF and HFP.

From the results illustrated in Table 1, in the case where the polymer compound in the electrolyte layer contained the three-component block copolymer, all of the mechanical strength characteristics, the liquid-retention ratio, and the capacity degradation speed were secured. Therefore, in the secondary battery including the electrolyte layer, superior battery characteristics were obtained.

The present application has been described with reference to the embodiment and Examples. However, the present application is not limited to the examples described in the embodiment and Examples, and various modifications may be made. For example, the description has been given with the specific examples of the case in which the battery structure is the laminated-film-type or the coin type, and the battery element has the spirally wound structure. However, applicable structures are not limited thereto. The secondary battery of the present application is similarly applicable to a battery having other battery structure such as a cylindrical-type battery and a square-type battery, or a battery in which the battery element has other structure such as a laminated structure.

Further, in the embodiment and Examples, the lithium ion secondary battery in which the anode capacity is obtained by inserting and extracting lithium has been described. However, applicable examples are not limited thereto. For example, the secondary battery of the present application may be a lithium metal secondary battery in which the anode capacity is obtained by precipitation and dissolution of lithium. Further, the secondary battery of the present application may be a secondary battery in which the anode capacity is obtained by the sum of the capacity by inserting and extracting lithium and the capacity by precipitation and dissolution of lithium by setting the capacity of an anode material capable of inserting and extracting lithium to a smaller value than that of the capacity of a cathode.

Further, in the embodiment and Examples, a description has been given of the case in which lithium is used as an electrode reactant. However, examples of the electrode reactant are not limited thereto. For example, the electrode reactant may be other Group 1 element such as sodium (Na) and potassium (K) in the long period periodic table, a Group 2 element such as magnesium (Mg) and calcium (Ca) in the long period periodic table, or other light metal such as aluminum (Al). Further, the electrode reactant may be an alloy containing any one or more elements out of the foregoing elements.

The effects described in the present specification are merely exemplification, and effects of the present application are not limited thereto. Further, other effects may be included therein.

It is possible to achieve at least the following configurations from the above-described example embodiments of the disclosure.

(1) A secondary battery including:
a cathode;
an anode; and
an electrolyte layer containing a nonaqueous electrolytic solution and a polymer compound, wherein
the polymer compound contains a block copolymer, and
the block copolymer contains vinylidene fluoride, hexafluoro propylene, and one or more of monomethyl maleate, trifluoroethylene, and chlorotrifluoroethylene as polymerization units.

(2) The secondary battery according to (1), wherein
a copolymerization amount of the vinylidene fluoride is larger than a copolymerization amount of the hexafluoro propylene, and
the copolymerization amount of the hexafluoro propylene is larger than a total of respective contents of the monomethyl maleate, the trifluoroethylene, and the chlorotrifluoroethylene.
(3) The secondary battery according to (1) or (2), wherein
the secondary battery is
a lithium ion secondary battery.
(4) A battery pack including:
a secondary battery according to any one of (1) to (3);
a control section configured to control operation of the secondary battery; and
a switch section configured to switch the operation of the secondary battery according to an instruction of the control section.
(5) An electric vehicle including:
a secondary battery according to any one of (1) to (3);
a conversion section configured to convert electric power supplied from the secondary battery into drive power;
a drive section configured to operate according to the drive power; and
a control section configured to control operation of the secondary battery.
(6) An electric power storage system including:
a secondary battery according to any one of (1) to (3);
one or more electric devices configured to be supplied with electric power from the secondary battery; and
a control section configured to control the supplying of the electric power from the secondary battery to the one or more electric devices.
(7) An electric power tool including:
a secondary battery according to any one of (1) to (3); and
a movable section configured to be supplied with electric power from the secondary battery.
(8) An electronic apparatus including a secondary battery according to any one of (1) to (3) as an electric power supply source.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A secondary battery comprising:
a cathode;
an anode; and
an electrolyte layer containing a nonaqueous electrolytic solution and a polymer compound, wherein the polymer compound contains a block copolymer, the block copolymer contains vinylidene fluoride, hexafluoro propylene, trifluoroethylene and chlorotrifluoroethylene as polymerization units, a copolymerization amount of the vinylidene fluoride is 74.6-96.6 wt % of the block copolymer, a copolymerization amount of the hexafluoro propylene is 3-25 wt % of the block copolymer, and the block copolymer comprises 1.5 wt % of trifluoroethylene and 1-3 wt % of chlorotrifluoroethylene.

2. The secondary battery according to claim 1, wherein a copolymerization amount of the vinylidene fluoride is larger than a copolymerization amount of the hexafluoro propylene, and the copolymerization amount of the hexafluoro propylene is larger than a total of respective contents of the monomethyl maleate, the trifluoroethylene, and the chlorotrifluoroethyl ene.

3. The secondary battery according to claim 1, wherein the secondary battery is a lithium ion secondary battery.

4. The secondary battery according to claim 1, wherein a copolymerization amount of vinylidene fluoride is larger than a copolymerization amount of hexafluoro propylene.

5. The secondary battery according to claim 1, wherein a copolymerization amount of hexafluoro propylene is larger than a copolymerization amount of trifluoroethylene and/or chlorotrifluoroethylene.

6. The secondary battery according to claim 1, wherein the block copolymer has one or more side chains.

7. The secondary battery according to claim 6, wherein vinylidene fluoride has one or more of a halogen group and a hydrogen elimination group as substituent groups, and the hydrogen elimination group is obtained by eliminating one hydrogen group from a compound selected from the group consisting of hexafluoro propylene, monomethyl maleate, trifluoroethylene, chlorotrifluoroethylene, methyl acrylate, ethyl acrylate, styrene, butadiene, hexafluoroacetone, ethylene oxide, propylene oxide, acrylonitrile, metacrylonitrile, and combinations thereof.

8. A battery pack comprising:
a secondary battery;
a control section configured to control operation of the secondary battery; and
a switch section configured to switch the operation of the secondary battery according to an instruction of the control section,
wherein the secondary battery includes a cathode; an anode; and an electrolyte layer containing a nonaqueous electrolytic solution and a polymer compound, the polymer compound contains a block copolymer, and the block copolymer contains vinylidene fluoride, hexafluoro propylene, trifluoroethylene and chlorotrifluoroethylene as polymerization units, a copolymerization amount of the vinylidene fluoride is 74.6-96.6 wt % of the block copolymer, a copolymerization amount of the hexafluoro propylene is 3-25 wt % of the block copolymer, and the block copolymer comprises 1.5 wt % of trifluoroethylene and 1-3 wt % of chlorotrifluoroethyl ene.

9. An electric vehicle comprising:
a secondary battery;
a conversion section configured to convert electric power supplied from the secondary battery into drive power;
a drive section configured to operate according to the drive power; and
a control section configured to control operation of the secondary battery,
wherein the secondary battery includes a cathode; an anode; and an electrolyte layer containing a nonaqueous electrolytic solution and a polymer compound, the polymer compound contains a block copolymer, and the block copolymer contains vinylidene fluoride, hexafluoro propylene, trifluoroethylene and chlorotrifluoroethylene as polymerization units, a copolymerization amount of the vinylidene fluoride is 74.6-96.6 wt % of the block copolymer, a copolymerization amount of the hexafluoro propylene is 3-25 wt % of the block copolymer, and the block copolymer comprises 1.5 wt % of trifluoroethylene and 1-3 wt % of chlorotrifluoroethyl ene.

10. An electric power storage system comprising:
a secondary battery;
one or more electric devices configured to be supplied with electric power from the secondary battery; and
a control section configured to control the supplying of the electric power from the secondary battery to the one or more electric devices,
wherein the secondary battery includes a cathode; an anode; and an electrolyte layer containing a nonaqueous electrolytic solution and a polymer compound, the polymer compound contains a block copolymer, and the block copolymer contains vinylidene fluoride, hexafluoro propylene, trifluoroethylene and chlorotrifluoroethylene as polymerization units, a copolymerization amount of the vinylidene fluoride is 74.6-96.6 wt % of the block copolymer, a copolymerization amount of the hexafluoro propylene is 3-25 wt % of the block copolymer, and the block copolymer comprises 1.5 wt % of trifluoroethylene and 1-3 wt % of chlorotrifluoroethylene.

11. An electric power tool comprising:
a secondary battery; and
a movable section configured to be supplied with electric power from the secondary battery,
wherein the secondary battery includes a cathode; an anode; and an electrolyte layer containing a nonaqueous electrolytic solution and a polymer compound, the polymer compound contains a block copolymer, and the block copolymer contains vinylidene fluoride, hexafluoro propylene, trifluoroethylene and chlorotrifluoroethylene as polymerization units, a copolymerization amount of the vinylidene fluoride is 74.6-96.6 wt % of the block copolymer, a copolymerization amount of the hexafluoro propylene is 3-25 wt % of the block copolymer, and the block copolymer comprises 1.5 wt % of trifluoroethylene and 1-3 wt % of chlorotrifluoroethyl ene.

12. An electronic apparatus comprising a secondary battery as an electric power supply source,
wherein the secondary battery includes a cathode; an anode; and an electrolyte layer containing a nonaqueous electrolytic solution and a polymer compound, the polymer compound contains a block copolymer, and the block copolymer contains vinylidene fluoride, hexafluoro propylene, trifluoroethylene and chlorotrifluoroethylene as polymerization units, a copolymerization amount of the vinylidene fluoride is 74.6-96.6 wt % of the block copolymer, a copolymerization amount of the hexafluoro propylene is 3-25 wt % of the block copolymer, and the block copolymer comprises 1.5 wt % of trifluoroethylene and 1-3 wt % of chlorotrifluoroethylene.

* * * * *